Sept. 22, 1931.  E. L. PEARSON  1,824,446
METHOD OF AND APPARATUS FOR PRODUCING MOTION PICTURES IN COLOR
Filed April 13, 1929
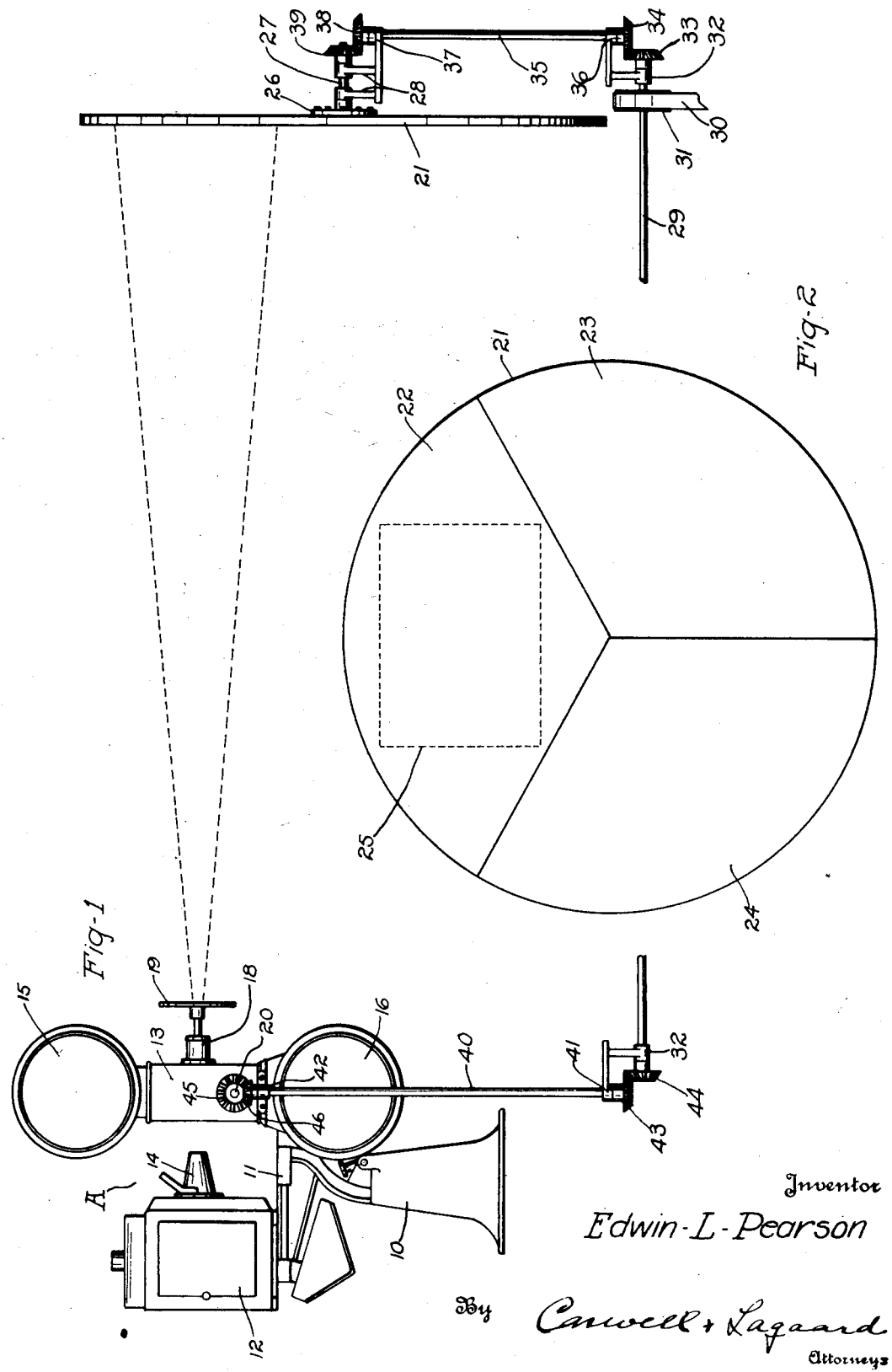

Patented Sept. 22, 1931

1,824,446

UNITED STATES PATENT OFFICE

EDWIN L. PEARSON, OF MINNEAPOLIS, MINNESOTA

METHOD OF AND APPARATUS FOR PRODUCING MOTION PICTURES IN COLOR

Application filed April 13, 1929. Serial No. 354,815.

My invention relates to motion pictures and has for its object to provide a method of and apparatus for producing motion pictures in colors, the existing colors of the object being most faithfully reproduced.

Another object of the invention resides in producing a device, whereby the ordinary motion picture projector may be utilized for colored motion pictures.

Another object of the invention resides in providing a device whereby the coloring effect is produced directly at the screen in contrast to the devices heretofore employed in which the coloring has been produced at the film or in the projector.

Another object of the invention resides in taking the pictures successively through different color filters and in projecting the same successively upon a screen having corresponding colored sections which sections are moved to bring the same into the field of projection as the corresponding pictures are projected.

A still further object of the invention resides in constructing the projection screen in the form of a rotating disk having the surface thereof divided into a number of sections colored with different colors, said sections adapted to be successively brought into the field of projection as the disk rotates.

A still further feature of the invention resides in synchronizing the operation of said projector with said disk so that a picture taken through a certain color filter is projected upon the portion of said disk colored to correspond with said color filter.

Other objects of the invention reside in the details of construction thereof and in the novel combination and arrangement of parts hereinafter described and illustrated.

In the drawings:

Fig. 1 is a side elevational view showing, in somewhat diagrammatic form a structure embodying my invention in apparatus for producing motion pictures in color and by means of which my improved method may be carried out.

Fig. 2 is an elevational view of the projection screen shown in Fig. 1.

It is a well known fact that light is composed of primary colors which, when combined in different proportions, will give all of the various colors known. It is further well known that due to the persistence of vision, images intermittently projected upon a screen in rapid succession appear to have continuity, and that different colors so projected appear to be simultaneously projected and diffused when viewed by the observer. By means of these principles and the laws of optics, I have produced a device whereby colored motion pictures may be readily projected in a manner now to be described.

For the purpose of illustrating the application of the invention, I have shown in Fig. 1 an ordinary motion picture projector which is indicated in its entirety at A. This device comprises a base or pedestal 10 which is formed with a bracket 11 supporting at the rear thereof the lamp and lamp house 12 together with the lens assembly 14, and at the forward portion thereof a case 13 containing the intermittent mechanism and the mechanism for feeding the film through the projector. This case has attached to it the upper reel magazine 15 and the lower reel magazine 16, and also includes the lens assembly 18 and shutter 19. The projector is further provided with a shaft 20 by means of which the same may be operated and which is utilized in the present invention in a manner to be presently described.

The projection screen utilized with my invention differs from those at present employed in the fact that the same is arranged with portions colored in accordance with the primary colors and movable to be successively presented at the field of projection. For this reason I employ a screen 21 which is preferably shaped in the form of a disk as shown in Fig. 2 and which is divided into three sector-shaped sections 22, 23 and 24 which are colored in accordance with the primary colors. For the sake of illustration, the section 22 may be considered as colored red, the section 23 as violet, and the section 24 as green. The field of projection which I have indicated by dotted lines at 25 in Fig. 2 may be at any desired portion of the screen.

The screen 21 has attached to it a flange 26 which has secured to it a shaft 27 issuing outwardly therefrom. This shaft is journaled in bearings 28, whereby the said screen may be rotated so as to successively move the various color sections 22, 23 and 24 into the field of projection. Shaft 27 may be rotated by means of a shaft 29 which may be driven from any suitable source of power as through a belt 30 and a pulley 31 mounted on said shaft. This shaft is journaled in two or more bearings 32 and has attached at one end thereof a bevel gear 33 meshing with a corresponding bevel gear 34 fast on another shaft 35. This latter shaft is journaled in bearings 36 and 37 and has attached to one end thereof a bevel gear 38 which meshes with a corresponding bevel gear 39 fast on the shaft 27. As the shaft 29 is rotated, the shafts 35 and 27 are simultaneously rotated causing the rotation of the disk 21 forming the projection screen.

With my invention the projection of the pictures must be synchronized with the rotation of the screen 21 and for this reason the said projector is preferably operated from the shaft 29 which rotates screen 21. This may be accomplished by means of a shaft 40 which is journaled in two bearings 41 and 42 and which has attached to it a bevel gear 43 meshing with a corresponding bevel gear 44 secured to the shaft 29. Shaft 40 drives the shaft 20 of projector A through bevel gears 45 and 46 secured to said shafts, respectively. By the proper selection of gear ratios the projector A can be so synchronized with respect to the screen 21 that each picture successively projected from said projector will be successively projected on the corresponding colored sections 22, 23 and 24 of the screen proper.

In the taking of the pictures to be used with my invention, a motion picture camera may be used in conjunction with a number of color filters, which in correspondence with the particular device described would be three in number corresponding to the primary colors of the projection screen 21. These screens would be successively interposed between the object photographed and the camera lens so that every third picture and multiple thereof would be taken through the same filter. In other words, if red, violet and green color filters were used, the first picture would be taken through the red color filter, the second picture through the violet color filter, the third picture through the green color filter, the fourth picture through the red and so on, each third picture being taken through the same color filter. These various results might readily be obtained by mounting the color screens in the form of a disk smiliar to the screen 21 and rotating the same in front of the camera lens, or the same may be accomplished in any desired manner.

In the projection of the pictures, the screen 21 is synchronized with the projector so that the picture photographed through the red filter is projected upon the red section of the screen and the picture photographed through the violet and green filters are correspondingly projected upon the violet and green sections of the screen. This has the effect of successively projecting upon the screen individually colored pictures in the primary colors which, when rapidly projected, give the effect to the eye of colored motion pictures closely portraying in color and motion real animated objects.

In the operation of the device the film is preferably mounted with respect to the feeding sprockets so that the particular film is projected upon the corresponding color section of the screen. If desired, however, the film may be mounted upon the driving sprocket without respect to the screen and the phase relation between the driving elements for the screen and projector shifted so as to bring the screen and projector into synchronism. Although I have referred to the use of three specific primary colors, it can be readily comprehended that two or more colors may be used and that the different colors so used produce white by the successive exposure thereof.

My invention is highly advantageous in that the ordinary motion picture projector may be utilized for the projection of colored motion pictures. By the coloring of the screen itself, faithfulness in the reproduction of the coloring of the objects photographed is produced and absence of color distortion and lack of or excess of coloring as occurring with other systems of colored motion picture projection is eliminated. Where the shutter of the projector is utilized the change from one color to the other is not perceptible and smoother and clearer pictures can be produced than by other means. The use of more than one light source and the projection through colored filters is entirely eliminated so that the amount of light projected upon the screen is not in any way reduced as compared with the ordinary method of motion picture projection.

Changes in the specific form of my invention, as herein disclosed, may be made within the scope of what is claimed without departing from the spirit of my invention.

Having described my invention, what I claim as new and desire to protect by Letters Patent is:

1. A projection device for colored motion pictures comprising a projector arranged to successively project images produced through different color filters, a projection screen from which the picture may be viewed having various sections colored to correspond to the filters through which the images are produced, and means for shifting the relative positions of said projector and projection screen to successively project the images upon the portions of the projection screen corresponding to the particular filters through which the images are produced.

2. A projection device for colored motion pictures comprising a projector adapted to successively emit light rays through images produced through different color filters, means from which the pictures may be viewed having colored surfaces corresponding to said filters, and means for successively moving said surfaces to intercept the light rays corresponding thereto.

3. A projection device for colored motion pictures comprising a projector arranged to successively project images produced through different color filters, a revoluble projection screen from which the pictures may be viewed with sectors thereof colored to correspond to said filters, and means for rotating said screen and operating said projector in synchronism to project the pictures taken through each of said filters upon the corresponding screen sectors.

4. A method of producing motion pictures in color which consists in successively making a series of photographic images of the objects photographed through different color filters, successively projecting said images upon a surface from which the pictures may be viewed, and in successively changing the coloring of the projection surface to conform to the color filters through which said images are produced.

5. The method of producing motion pictures in color which consists in successively making a series of photographic images of the objects photographed through different color filters, in successively projecting said images upon a surface from which the pictures may be viewed, and at a speed sufficient to give continuity to the pictures, and in changing the color of the projection surface at the same rate of speed and in synchronism with the successive projection of the images upon the surface.

6. A projection device for colored motion pictures comprising a projector arranged to successively and intermittently project images produced through different color filters, means upon which the images may be projected and from which the pictures may be viewed, and means for successively changing the coloring of said last named means to correspond to the filter through which the images are produced, said means operating in synchronism with the successive projection of the images.

7. A projection device for colored motion pictures comprising a projector, a film operating in conjunction with said projector having successive images thereon produced through different color filters, an intermittent mechanism for successively projecting the images of said film, a screen from which the picture may be viewed having portions thereof colored to correspond to the filters through which the images are produced, and means driven in synchronism with said intermittent mechanism for changing the coloring of the surface on which the successive images are projected.

In testimony whereof I have affixed my signature to this specification.

EDWIN L. PEARSON.